(12) United States Patent
Sparks et al.

(10) Patent No.: US 7,961,849 B2
(45) Date of Patent: Jun. 14, 2011

(54) IMPLEMENTING AN EMERGENCY SERVICES SOLUTION

(75) Inventors: Donald L. Sparks, Austin, TX (US); Andrew S. Bender, McKinney, TX (US)

(73) Assignee: Genband US LLC, Plano, TX (US)

( * ) Notice: Subject to any disclaimer, the term of this patent is extended or adjusted under 35 U.S.C. 154(b) by 1046 days.

(21) Appl. No.: 11/678,686

(22) Filed: Feb. 26, 2007

(65) Prior Publication Data

US 2008/0205600 A1 Aug. 28, 2008

(51) Int. Cl.
*H04M 11/04* (2006.01)
(52) U.S. Cl. .......................................................... 379/45
(58) Field of Classification Search .................. 379/45; 713/168
See application file for complete search history.

(56) References Cited

U.S. PATENT DOCUMENTS

| 5,563,931 A | 10/1996 | Bishop et al. |
| 2003/0061319 A1 | 3/2003 | Manzardo ..................... 709/221 |

FOREIGN PATENT DOCUMENTS

EP 1 432 254 A1 6/2004

OTHER PUBLICATIONS

PCT Notification of Transmittal of the International Search Report and the Written Opinion of the International Searching Authority, PCT/US2008/054941, 11 pages, Jun. 30, 2008.
Communication pursuant to Article 94(3) EPC for European Application No. 08 730 697.3 (Sep. 28, 2010).

*Primary Examiner* — William D Cumming
(74) *Attorney, Agent, or Firm* — Jenkins, Wilson, Taylor & Hunt, P.A.

(57) ABSTRACT

A system, method, and apparatus for redirecting an emergency communication include initiating emergency communication from an endpoint. Unavailability of a softswitch is determined, and an emergency server is identified that handles call control for emergency communication from the endpoint if the softswitch is unavailable. Emergency communication is initiated with the emergency server.

34 Claims, 12 Drawing Sheets

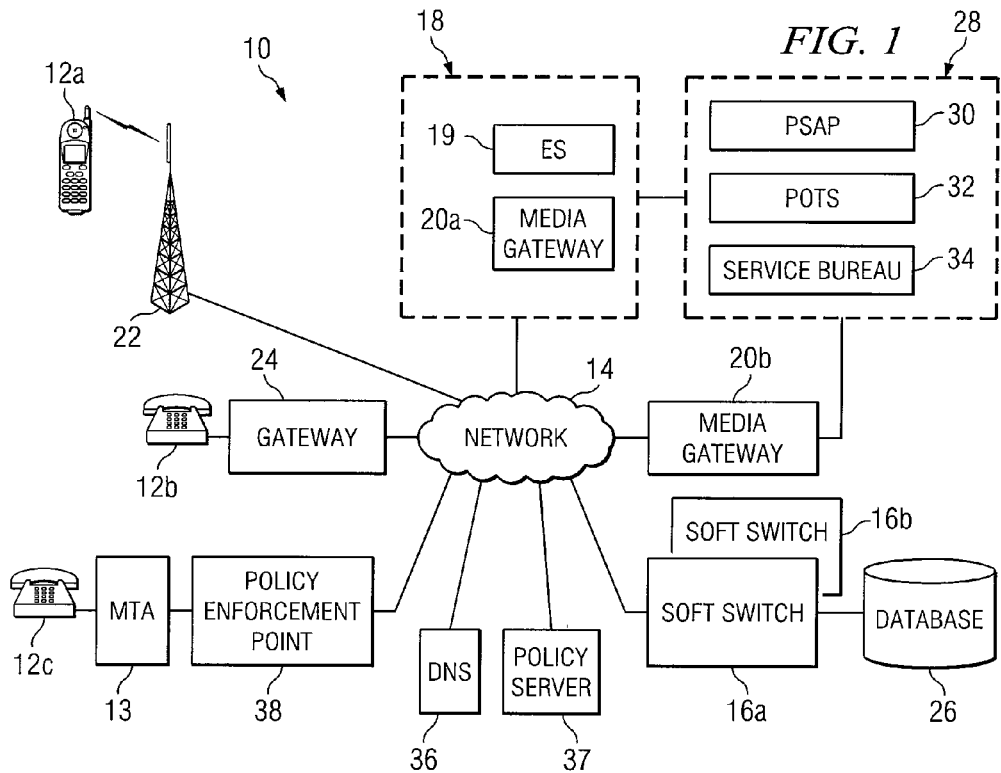
FIG. 1
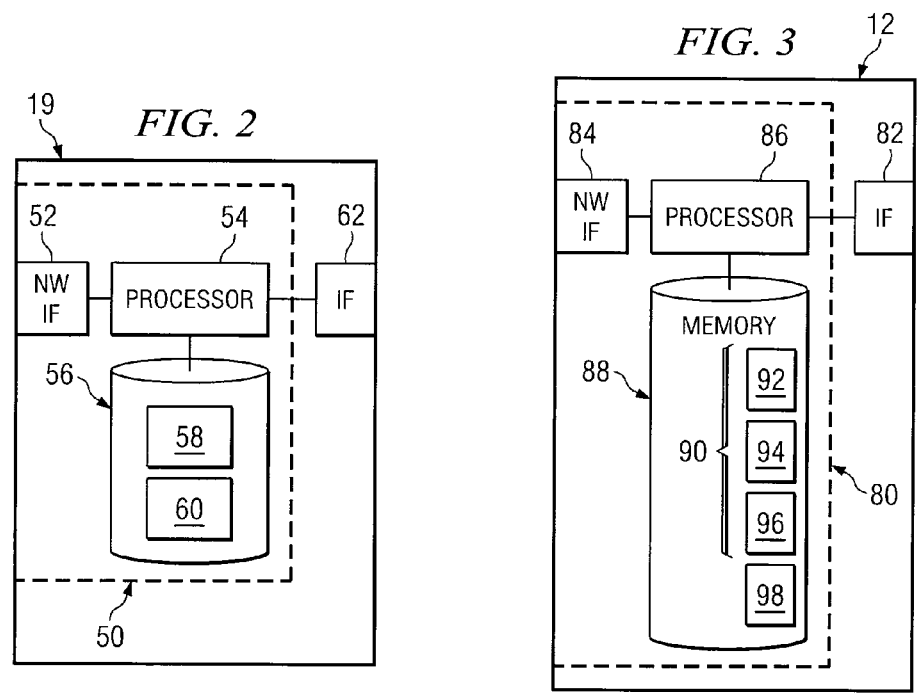
FIG. 2
FIG. 3

IMPLEMENTING AN EMERGENCY SERVICES SOLUTION

TECHNICAL FIELD

This invention relates generally to communication services, and more specifically to, implementing an emergency services solution.

BACKGROUND

Endpoints communicating through a packet-based network are conventionally under control of a softswitch during communication. However, if the softswitch fails, the endpoint cannot initiate or be involved in any communication, including communication to emergency services.

SUMMARY OF THE DISCLOSURE

In accordance with the present invention, disadvantages and problems associated with previous techniques for communicating with emergency services when a softswitch fails may be reduced or eliminated.

According to one embodiment of the present invention, a system, method, and apparatus for redirecting an emergency communication include initiating emergency communication from an endpoint. Unavailability of a softswitch is determined, and an emergency server is identified that handles call control for emergency communication from the endpoint if the softswitch is unavailable. Emergency communication is initiated with the emergency server.

Certain embodiments of the invention may provide one or more technical advantages. A technical advantage of one embodiment includes facilitating communication with emergency services even though a failure occurs in the system, such as a softswitch failure. Therefore, users may have a continuous ability to contact emergency services regardless of possible problems in the system.

Certain embodiments of the invention may include none, some, or all of the above technical advantages. One or more other technical advantages may be readily apparent to one skilled in the art from the figures, descriptions, and claims included herein.

In one embodiment, logic for redirecting an emergency communication is embodied in a computer readable medium. The logic is operable to initiate emergency communication from an endpoint, determine unavailability of a softswitch, identify an emergency server that handles call control for emergency communication from the endpoint if the softswitch is unavailable, and initiate emergency communication with the emergency server.

BRIEF DESCRIPTION OF THE DRAWINGS

For a more complete understanding of the present invention and its features and advantages, reference is now made to the following description, taken in conjunction with the accompanying drawings, in which:

FIG. 1 illustrates a system for implementing an emergency services solution for endpoints;

FIG. 2 is a detailed illustration of an embodiment of an emergency server that handles emergency communications for an endpoint;

FIG. 3 is a detailed illustration of an embodiment of the endpoint that communicates in the system;

DETAILED DESCRIPTION OF THE DRAWINGS

Figure 4A:
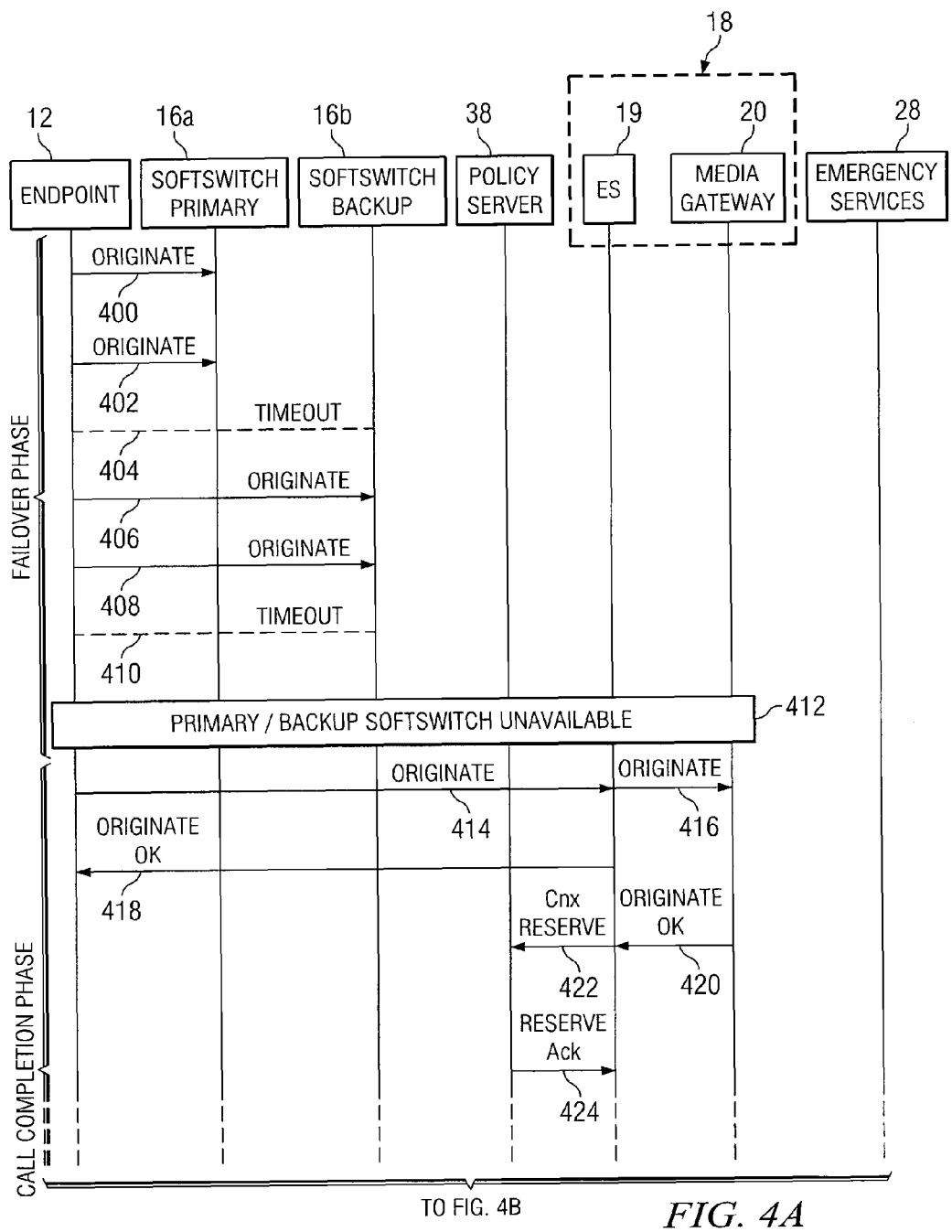
FIG. 4 is a call-flow diagram that illustrates the endpoint initiating use of an emergency module for emergency communications.

Embodiments of the present invention and its advantages are best understood by referring to FIGS. 1 through 8 of the drawings, like numerals being used for like and corresponding parts of the various drawings.

FIG. 1 illustrates a system 10 for implementing an emergency services solution for endpoints 12. System 10 includes endpoints 12 that communicate over a network 14 using softswitch(es) 16. If a failure occurs in system 10, endpoints 12 may contact emergency services 28 using emergency module 18.

System 10 includes any suitable number of endpoints 12 that communicate with each other through network 14. Endpoint 12 communicates information using network 14, such as communicating any suitable information to contact emergency services 28. Endpoints 12 may send and receive data signals, audio signals, video signals, or any combination of the preceding. The signals may communicate information such as data, audio, video, multimedia, and/or any suitable type of information in appropriate packets. For example, endpoints 12 may participate in packet-based communication where voice information is communicated in voice packets. The communication may be in the form of a call, a message, or any suitable form of communication. Endpoints 12 may include, for example, a telephone, an Internet Protocol (IP) telephone, a wireless or cellular telephone, a computer supporting a telephony application, or any other endpoint suitable for communicating. As an example, endpoint 12a represents a wireless telephone that communicates with base station 22. Base station 22 represents any suitable component to facilitate communication between a wireless telephone and network 14. As yet another example, endpoint 12b represents a telephone, such as a Plain Old Telephone Service (POTS) telephone or an IP telephone, that communicates with gateway 24 to facilitate communication in system 10. Gateway 24 represents any suitable component that facilitates communication between endpoint 12b and network 14. For example, gateway 24 may include a Public Switched Telephone Network (PSTN) gateway or a Voice over IP (VOIP) gateway that facilitates communication between endpoint 12b and network 14. As another example, endpoint 12c may represent a device coupled to a Multimedia Terminal Adapter (MTA) 13. Endpoints 12 may include any suitable type of communication device, such as an Integrated Access Device (IAD) or an optical network endpoint. Endpoints 12 may support, for example, IP, Session Initiation Protocol (SIP), Media Gateway Control Protocol (MGCP), H.248, H.323, other suitable device or call control communication protocols, or any suitable combination of the preceding.

Network 14 represents a packet-based network that allows endpoints 12 to communicate with other networks, other endpoints 12, or other components in system 10. For example, network 14 provides support for any suitable packet-based protocol, that may convey the Internet Protocol (IP), such as Asynchronous Transfer Mode (ATM), Synchronous Optical Network (SONET), cable, 3G mobile wireless, or IP Multimedia Subsystem. Network 14 may include a PSTN, a metropolitan area network (MAN), a local area network (LAN), a wide area network (WAN), any other public or private data network, a local, regional, or global communication network, such as the Internet, an enterprise intranet, other suitable wireline or wireless communication link, or any suitable combination of the preceding. Network 14 may include any combination of gateways, routers, hubs, switches, access points, base stations, and any other hardware and/or software that may implement any suitable protocol or communication. For example, network 14 supports any suitable device and/or call control protocol, such as SIP, MGCP, H.248, H.323, other suitable communication protocol, or any suitable combination of the preceding.

Softswitch 16 may include one or more devices that provide call control functions for endpoints 12. In the illustrated embodiment, redundancy of softswitch 16 is provided. Accordingly, softswitch 16a is the primary softswitch that provides call control, and softswitch 16b is the backup softswitch that provides call control if primary softswitch 16a fails. Softswitch 16 controls any suitable communication for endpoint 12. For example, softswitch 16 controls communication between endpoints 12, and softswitch 16 controls communication from endpoint 12 to emergency services 28. Softswitch 16 may receive keep-alive messages from endpoint 12 that confirm softswitch 16 is functioning. Softswitch 16 may include any suitable component, such as a call agent, media gateway controller, or a gatekeeper that provides call control functions. Softswitch 16 may include any other hardware and/or software that may implement any suitable protocol or communication.

Softswitch 16 retrieves information regarding endpoints 12 from database 26, which stores data in any suitable format or media. For example, database 26 may include an identifier for endpoints 12 and identifiers for softswitch 16. Database 26 represents any suitable memory structure operable to store data and to provide data for retrieval.

Emergency module 18 provides emergency services call control for endpoints 12 and directs endpoints 12 to emergency services 28. Emergency module 18 supports any suitable network 14, signaling protocol, endpoints 12 of varying capabilities, or other suitable operating modes for call processing service. In the illustrated embodiment, emergency module 18 includes emergency server (ES) 19 and media gateway 20. In another embodiment, emergency module 18 only includes ES 19. ES 19 provides call control for endpoints 12 when endpoint 12 attempts to communicate with emergency services 28 if a failure occurs in system 10, such as failure in network 14 or a failure of softswitch 16. For example, ES 19 handles emergency calls that endpoint 12 makes when softswitch 16 is not available to provide the call control for endpoint 12. The failure in system 10 may occur for any suitable reason, such as softswitch 16 functioning at full capacity, or the failure of a router in network 14. In particular embodiments, because ES 19 only handles emergency communications for endpoints 12, softswitch 16 may not have knowledge of ES 19. Furthermore, ES 19 may control calls to emergency services 28 even if the failure occurs in network 14. Although described as a server, ES 19 may also refer to any hub, switch, router, gateway, or other suitable network component that exchanges information with endpoints 12.

Media gateway 20 represents any suitable component that converts media, such as data, voice, or video, between networks. For example, media gateway 20 may provide such functions as media compression/decompression, packetization, transcoding or bearer internetworking between network 14 and emergency services 28. In an embodiment, ES 19 includes media gateway 20, and in another embodiment, media gateway 20 includes ES 19. Media gateway 20 enables a connection between endpoint 12 and emergency services 28 using softswitch 16 or ES 19. In a particular embodiment, media gateway 20a provides a media path between endpoint 12 and emergency services 28 when emergency module 18 is in use, and media gateway 20b, coupled to network 14, provides a media path between endpoint 12 and emergency services 28 when softswitch 16 is in use.

Emergency services 28 include any suitable service that handles emergency communications, such as a 911 call. Emergency services 28 represent the actual point of termination of the emergency communication or any suitable number of elements that direct the emergency communication to a responder. A user may contact emergency services 28 using any suitable technique, such as dialing 911 in the United States and Canada, or dialing 999 in the United Kingdom, or dialing 112 in European Union countries. In the illustrated embodiment, emergency services 28 include a Public Safety Answering Point (PSAP) 30, a POTS 32, and a service bureau 34. PSAP 30, POTS 32, and service bureau 34 each provide assistance to a user in an emergency situation. The user may contact any suitable emergency service 28 depending on the user's location, the nature of the user's emergency, or any other suitable criteria. For example, if endpoint 12 is in a small town, contacting emergency services 28 may include contacting POTS 32 at a police station of the town. As another example, if endpoint 12 is in a metropolitan area, contacting emergency services 28 may include contacting PSAP 30 that gathers specific information about the emergency and facilitates dispatching aid to the user. As yet another example, a user may contact service bureau 34 that directs the communication to an emergency responder or a PSAP.

In the illustrated embodiment, system 10 includes Domain Name Server (DNS) 36, which represents any suitable server that translates names or user identifiers into network addresses. For example, if a host name describes ES 19, DNS 36 may resolve that name into an IP address understandable by endpoint 12.

Policy server 37 represents any suitable server that manages one or more policies within system 10. For example, policy server 37 interacts with a Policy Enforcement Point 38 that ensures specific Quality of Service (QoS), enforces admission controls, enforces border security, and coordinates authentication, authorization, and accounting. If system 10 includes policy server 37, ES 19 may interact with policy server 37 to enforce policies in system 10. Policy Enforcement Point 38 may include a Cable Modem Termination System (CMTS), a session border controller (SBC), or other suitable element that handles policy enforcement. In the illustrated embodiment, Policy Enforcement Point 38 couples to MTA 13.

In operation, endpoints 12 exchange information and communicate the information over network 14. Conventionally, softswitch 16a controls the communication of endpoints 12. For example, endpoint 12a places a call by dialing a destination number, such as the number to reach emergency services 28. If softswitch 16a is in operation, softswitch 16a resolves the destination number to the appropriate jurisdiction to handle the call, and sends the call to media gateway 20 coupled to network 14. In an embodiment, softswitch 16*a* resolves the destination number according to the location and subscriber information of endpoint 12*a*. The call is delivered to the appropriate emergency service 28 from media gateway 20.

However, softswitch 16*a* may not operate properly. In some cases, backup softswitch 16*b* may take over for the call control functions of endpoint 12*a*. If softswitch 16*a* and 16*b* both fail, endpoint 12*a* may not be able to communicate with emergency services 28.

Emergency module 18 handles communications to emergency services 28 if a failure occurs in system 10. As discussed in further detail below, endpoint 12 may detect the failure and begin using emergency module 18 for emergency communications, or ES 19 may inform endpoint 12 that a failure has occurred and endpoint 12 begins using emergency module 18 for emergency communications.

Endpoint 12 attempts to contact emergency services 28 during the failure. ES 19 resolves the call based on location of endpoint 12*a* and subscriber information and sends the call to media gateway 20. The call is transmitted to the appropriate emergency service 28 from media gateway 20.

Modifications, additions, or omissions may be made to system 10 without departing from the scope of the invention. For example, system 10 may not have policy enforcement functions and may not include policy server 38. As another example, network 14 may support protocols specific to cable. As yet another example, endpoints 12 may use any other suitable technique to failover to emergency module 18 and restore communication with softswitch 16, as will be discussed in FIGS. 4-8. Moreover, the operations of system 10 may be performed by more, fewer, or other components. Any suitable logic comprising software, hardware, other logic, or any suitable combination of the preceding may perform the functions of system 10.

FIG. 2 is a detailed illustration of an embodiment of ES 19 that handles emergency communications for endpoint 12. ES 19 includes control components 50 and interface 62. Control components direct the operation of ES 19, and interface 58 communicates with media gateway 20 to transmit emergency communications to emergency services 28.

Control components 50 include a network interface 52, a processor 54, and memory 56. Network interface 52 allows ES 19 to exchange information with network 14. For example, network interface 52 communicates keep-alive messages to softswitch 16 to determine whether softswitch 16 is active and can continue handling the call control processing services for endpoint 12. As another example, network interface 52 communicates information to endpoint 12 to facilitate emergency call processing, such as communicating an identifier of ES 19 to endpoint 12. As yet another example, network interface 52 receives responses from softswitch 16 that inform ES 19 that softswitch 16 is active. Network interface 52 represents any port or connection, real or virtual, including any suitable hardware and/or software that allow ES 19 to exchange information with network 14, endpoints 12, or other elements of system 10.

Processor 54 controls the operation and administration of ES 19 by processing information received from network interface 52 and memory 56. Processor 54 includes any hardware, software, or both that operate to control and process information. For example, processor 54 may be a programmable logic device, a microcontroller, a microprocessor, any suitable processing device, or any combination of the preceding.

Memory 56 stores, either permanently or temporarily, data, code 58, identifier 60, or other information for processing by processor 54. Memory 54 includes any one or a combination of volatile or nonvolatile local or remote devices suitable for storing information. For example, memory 56 may include random access memory (RAM), read only memory (ROM), magnetic storage devices, optical storage devices, any other suitable information storage device, or any suitable combination of these devices.

Code 58 controls the operation of ES 19, and includes software, executable files, and/or appropriate logic modules. For example, code 58 may include software to detect whether softswitch 16 is available according to the keep-alive messages. As another example, code 58 may include executable files capable of initiating processing of emergency communications for endpoint 12 if ES 19 detects the unavailability of softswitch 16. Memory 56 also includes identifier 60, which identifies ES 19 to system 10. Identifier 60 may include an IP address, a uniform resource identifier (URI), or any other suitable type of identifier. Interface 62 facilitates communication between ES 19 and media gateway 20. If ES 19 takes over call processing of emergency communications, ES 19 transmits the communication to media gateway 20, which enables the connection between endpoint 12 and emergency services 28. Interface 62 represents any port or connection, real or virtual, including any suitable hardware, software, or a combination of the preceding that allows ES 19 to exchange information with media gateway 20 or other suitable element (s).

Modifications, additions, or omissions may be made to ES 19. For example, ES 19 may include information identifying endpoints 12, softswitches 16*a* and/or 16*b*, DNS server 36, policy server 37, any other element, or any suitable combination of the preceding. As another example, ES 19 may interface with database 26 to obtain information about endpoints 12 and/or emergency services 28. Additionally, any suitable logic comprising software, hardware, other logic, or any suitable combination of the preceding may perform the functions of ES 19.

FIG. 3 is a detailed illustration of an embodiment of endpoint 12 that communicates in system 10. Endpoint 12 includes control components 80 and interface 82. Control components 80 direct the operation of endpoint 12. Interface 82 receives inputs from a user and/or provides outputs to the user.

Control components 80 include a network interface 84, a processor 86, and a memory 88. Network interface 84 allows endpoint 12 to exchange information with network 14. For example, network interface 84 may facilitate determining whether a failure has occurred in system 10 or receive information from ES 19 that it will handle emergency communications for endpoint 12. Network interface 84 represents any port or connection, real or virtual, including any suitable hardware and/or software that allow endpoint 12 to exchange information with network 14, other endpoints 12, or other elements of system 10.

Processor 86 controls the operation and administration of endpoint 12 by processing information received from network interface 84 and memory 88. Processor 86 includes any hardware, software, or both that operate to control and process information. For example, processor 86 may be a programmable logic device, a microcontroller, a microprocessor, any suitable processing device, or any combination of the preceding.

Memory 88 stores, either permanently or temporarily, data, operational software, and other information for processing by processor 86. Memory 88 includes any one or a combination of volatile or nonvolatile local or remote devices suitable for storing information. For example, memory 88 may include RAM, ROM, magnetic storage devices, optical storage devices, any other suitable information storage device, or any suitable combination of these devices. Memory 88 includes controller addresses 90 of various elements that may perform control functions for endpoint 12. For example, controller addresses 90 include a primary address 92 for softswitch 16a, a backup address 94 for softswitch 16b, and an emergency address 96 for ES 19. These addresses 90 may include any suitable type of identifier, such as a name, a network address, or a URI, that identifies the element. Endpoint 12 may determine controller addresses 90 from network 14 during registration of endpoint 12 to network 14. As discussed below, endpoint 12 may also initiate the use of ES 19 for emergency communications using emergency address 96. In another embodiment, endpoint 12 may not store emergency address 96. In this embodiment, as discussed below, ES 19 may masquerade its IP address as primary address 92 to receive communications from endpoint 12 during failover of softswitch 16. Therefore, endpoint 12 may use ES 19 for emergency call processing without having an emergency address 96 in memory 88.

Code 98 includes software, executable files, and/or appropriate logic modules when executed to control the operation of endpoint 12. For example, code 98 may include executable files capable of initiating use of emergency module 18 for emergency communications when a failure occurs in system 10. Interface 82 includes components that perform basic communication functions, such as placing and receiving a call. Interface 82 may include a keypad, buttons to adjust the settings of endpoint 12, a handset, a microphone, a speakerphone, or other suitable interfaces.

Modifications, additions, or omissions may be made to endpoint 12. For example, endpoint 12 may include any suitable number of interfaces 82 to facilitate interaction between the user and endpoint 12. Additionally, any suitable logic comprising software, hardware, other logic, or any suitable combination of the preceding may perform the functions of endpoint 12.

FIGS. 4-8 are call-flow diagrams that illustrate various uses of emergency module 18 for emergency communications. As mentioned above, system 10 may communicate using any suitable protocol. The illustrated call-flow diagrams provide a representation of exemplary message exchanges when system 10 uses MGCP. The messages may vary according to the network type, configuration, and protocols in use between elements. For example, additional or fewer messages may occur if system 10 uses another protocol. As another example, the messages may occur in any suitable order. The order of messages may vary according to the network type, configuration, and protocols in use between elements. Although described in a particular sequence, messages in the call-flow diagrams may occur serially or in parallel in any suitable order.

Figure 4B:
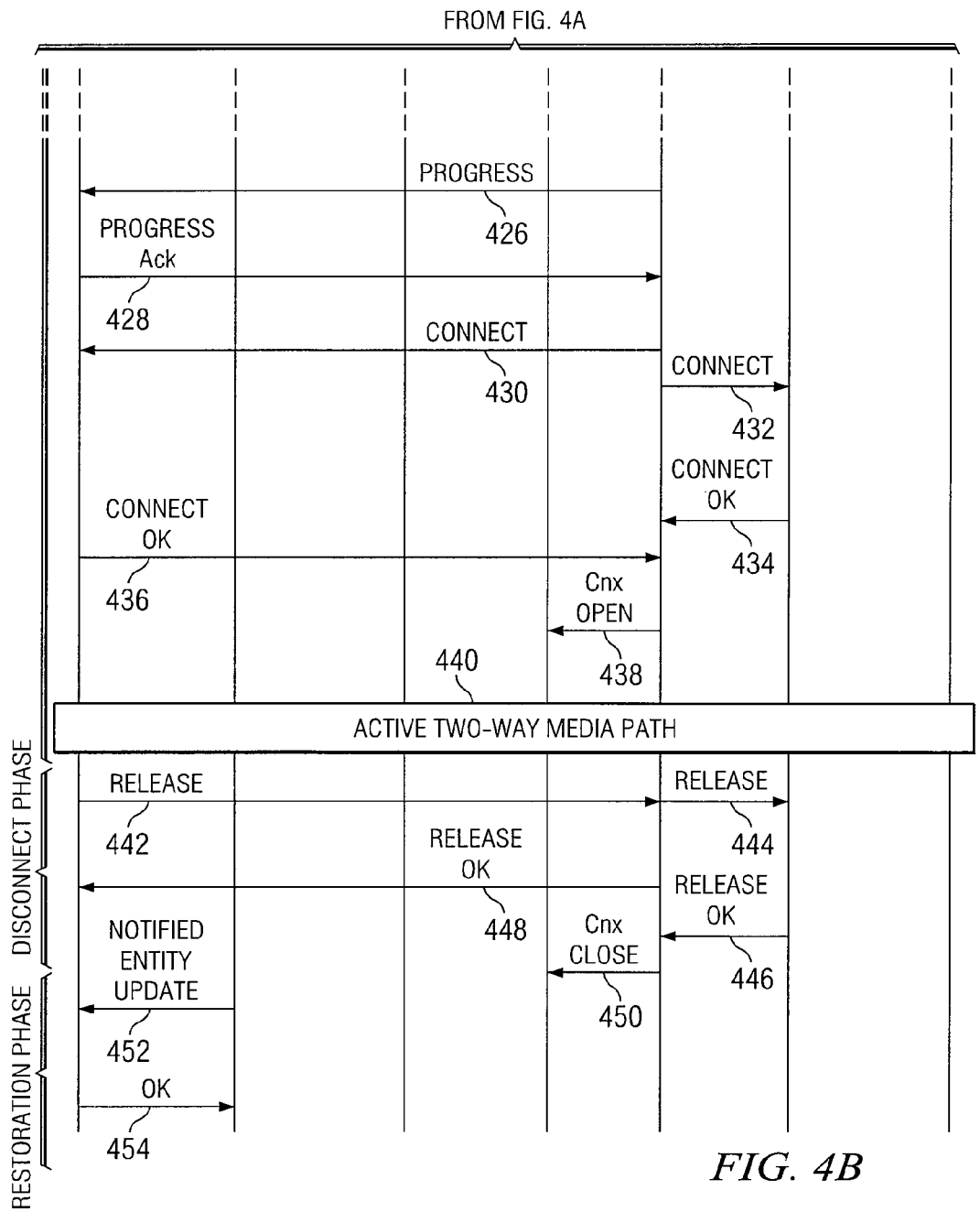

FIG. 4 is a call-flow diagram that illustrates endpoint 12 initiating use of emergency module 18 for emergency communications. For normal operation, endpoint 12 attempts to use primary softswitch 16a for the call processing service. Endpoint 12 uses primary address 92 to communicate Originate messages to primary softswitch 16a in messages 400 and 402. A timeout occurs at 404, which informs endpoint 12 that primary softswitch 16a is not responding. Endpoint 12 may attempt to originate a call using primary softswitch 16a over any suitable number of attempts or over any suitable period of time.

In the illustrated embodiment, endpoint 12 is configured to interface with backup softswitch 16b in addition to primary softswitch 16a. In other embodiments, endpoint 12 may only interface with primary softswitch 16a. Because the primary softswitch 16a does not respond, endpoint 12 attempts to use backup softswitch 16b for the call processing service. Endpoint 12 uses backup address 94 to communicate Originate messages to backup softswitch 16b in messages 406 and 408. A timeout occurs at 410, which informs endpoint 12 that backup softswitch 16b is not responding. Endpoint 12 may attempt to originate a call using backup softswitch 16b over any suitable number of attempts or over any suitable period of time. At 412, system 10 determines that primary softswitch 16a and backup softswitch 16b are unavailable.

Because of the unavailability of primary softswitch 16a and backup softswitch 16b, endpoint 12 contacts ES 19 for the provision of emergency call processing services. Endpoint 12 may be configured to initiate contact to ES 19 upon determining primary softswitch 16a and backup softswitch are unavailable. At message 414, endpoint 12 uses emergency address 96 to communicate an Originate message to ES 19, and ES 19 communicates an Originate message to media gateway 20 at message 416. ES 19 acknowledges the Originate message by communicating an Originate OK to endpoint 12 at message 418, and media gateway 20 acknowledges the Originate message by communicating an Originate OK to ES 19 at message 420.

In the illustrated embodiment, a connection is reserved through an exchange with policy server 38 in preparation for a bearer media stream between endpoint 12 and emergency services 28. ES 19 communicates a Connection Reserve message to policy server 38 at message 422, and policy server 38 acknowledges the message by communicating a Reserve Acknowledgment to ES 19 at message 424.

If an emergency service 28 does not answer a call immediately, ES 19 may provide a progress indication in message 426 to endpoint 12. Endpoint 12 may acknowledge the progress indication as shown in message 428. When an emergency service 28 accepts the call, a connection is created and signaled to endpoint 12 and media gateway 20. ES 19 communicates a Connect message to endpoint 12 at message 430 and to media gateway 20 at message 432. Media gateway 20 acknowledges the Connect message at message 434, and endpoint 12 acknowledges the Connect message at message 436. ES 19 activates the bearer connection by communicating a Connection Open message to policy server 38 at message 438. An active two-way media path is established between endpoint 12 and emergency services 28 using media gateway 20 at 440.

To disconnect the call, endpoint 12 communicates a Release message to ES 19 at message 442. ES 19 communicates a Release message to media gateway 20 at message 444. Media gateway 20 and ES 19 acknowledge the Release messages at messages 446 and 448, respectively. Because ES 19 opened a connection at message 438, ES 19 closes the connection by communicating a Connection Close message to policy server 38 at message 450.

Endpoint 12 may continue using emergency module 18 for call processing of emergency services while primary softswitch 16a and backup softswitch 16b are unavailable. When primary softswitch 16a or backup softswitch 16b become available, endpoint 12 may begin using softswitch 16a and 16b for normal and emergency call processing services. In the illustrated embodiment, primary softswitch 16a communicates the change in availability to endpoint 12 by communicating a Notified Entity Update at message 452. Endpoint 12 acknowledges the message at message 454. In another embodiment, endpoint 12 may detect the availability of primary softswitch 16a or backup softswitch 16b by communicating another Originate message to one or both of softswitch 16a and 16b.

Figure 5A:
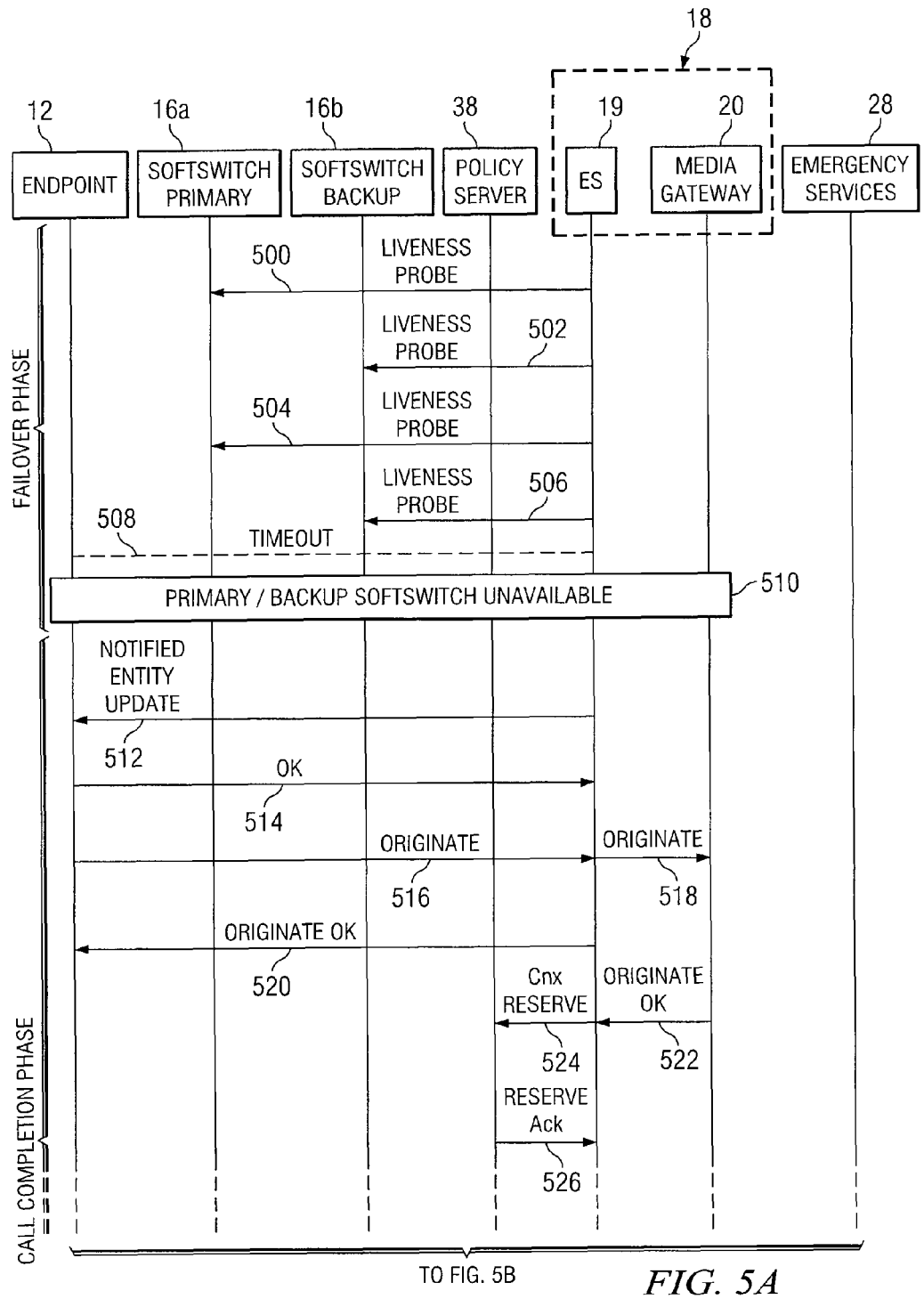
FIG. 5 is a call-flow diagram that illustrates the emergency server initiating use of the emergency module for emergency communications.
Figure 5B:
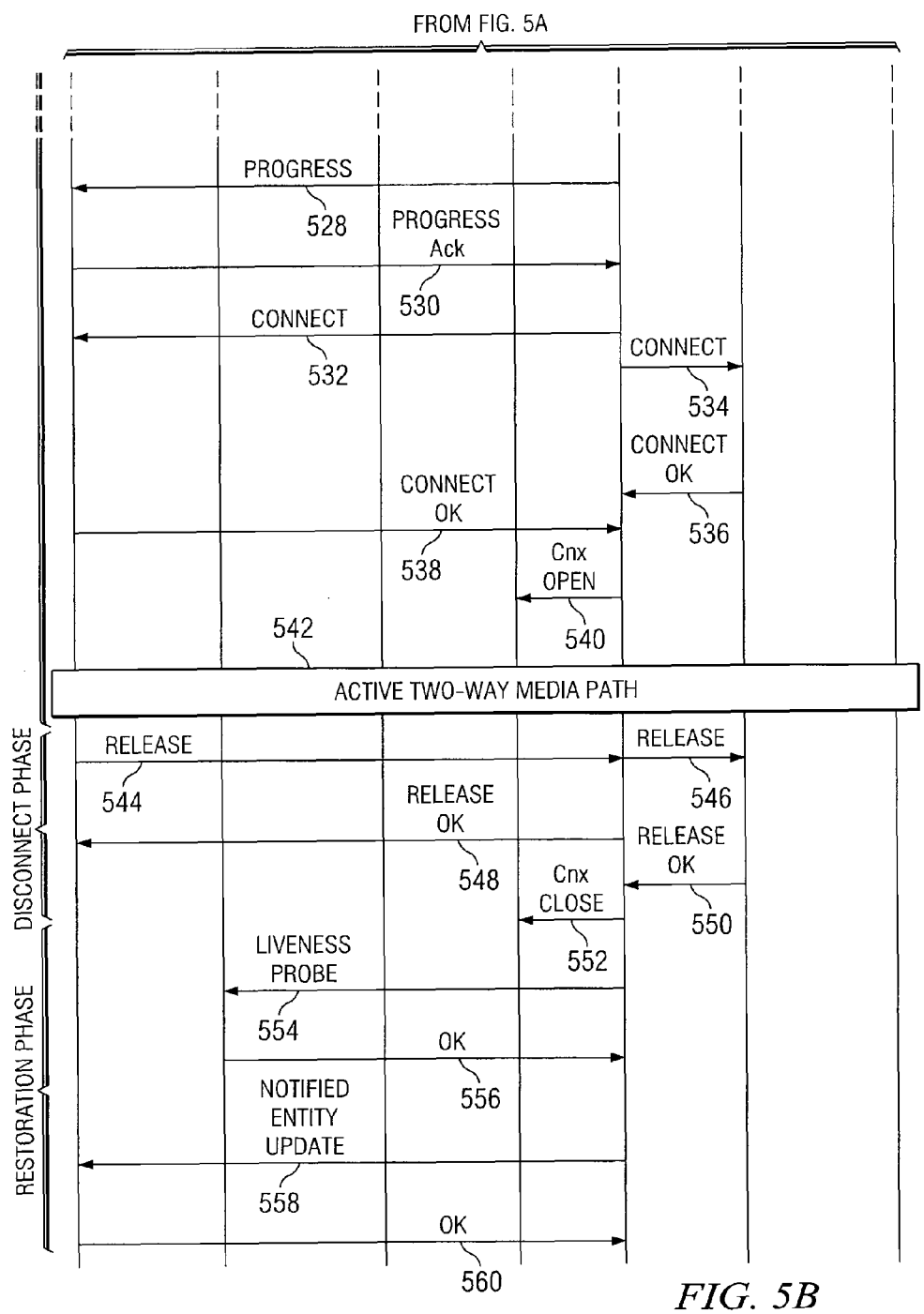

FIG. 5 is a call-flow diagram that illustrates ES 19 initiating use of emergency module 18 for emergency communications. ES 19 performs periodic liveness detection of primary softswitch 16a and backup softswitch 16b. In the illustrated embodiment, ES 19 communicates liveness probes to primary softswitch 16a at messages 500 and 504, and ES 19 communicates liveness probes to backup softswitch 16b at messages 502 and 506. A timeout occurs at 508. System 10 determines that primary softswitch 16a and backup softswitch 16b are unavailable at 510.

Because of the unavailability of primary softswitch 16a and backup softswitch 16b, ES 19 contacts endpoint 12 to provide emergency call processing services. ES 19 initiates the contact with endpoint 12 if other call processing services are unavailable. At message 512, ES 19 communicates a Notified Entity Update to inform endpoint 12 that ES 19 is available for emergency call processing services. Endpoint 12 responds by communicating an OK message at message 514. As part of message 512 or separately, ES 19 may also communicate, directly or inherently, emergency address 96.

If endpoint 12 attempts a call to emergency services 28, endpoint 12 uses emergency address 96 to communicate an Originate message at message 516 to ES 19. ES 19 communicates an Originate message at message 518 to media gateway 20. ES 19 communicates an Originate OK message to endpoint 12 at message 520, and media gateway 20 communicates an Originate OK message to ES 19 at message 522.

In the illustrated embodiment, a connection is reserved through an exchange with policy server 38 in preparation for a bearer media stream between endpoint 12 and emergency services 28. ES 19 communicates a Connection Reserve message to policy server 38 at message 524, and policy server 28 acknowledges the message by communicating a Reserve Acknowledgement to ES 19 at message 526.

If an emergency service 28 does not answer a call immediately, ES 19 may provide a progress indication in message 528 to endpoint 12. Endpoint 12 may acknowledge the progress indication as shown in message 530. When an emergency service 28 accepts the call, a connection is created and signaled to endpoint 12 and media gateway 20. ES 19 communicates a Connect message to endpoint 12 at message 532 and to media gateway 20 at message 534. Media gateway 20 acknowledges the Connect message at message 536, and endpoint 12 acknowledges the Connect message at message 538. ES 19 activates the bearer connection by communicating a Connection Open message to policy server 38 at message 540. An active two-way media path is established between endpoint 12 and emergency services 28 using media gateway 20 at 542.

To disconnect the call, endpoint 12 communicates a Release message to ES 19 at message 544. ES 19 communicates a Release message to media gateway 20 at message 546. ES 19 and media gateway 20 acknowledge the Release messages at messages 548 and 550, respectively. Because ES 19 opened a connection at message 540, ES 19 closes the connection by communicating a Connection Close message to policy server 38 at message 552.

Endpoint 12 may continue using emergency module 18 for call processing of emergency services while primary softswitch 16a and backup softswitch 16b are unavailable. When primary softswitch 16a or backup softswitch 16b become available, endpoint 12 may begin using softswitch 16a and 16b for normal and emergency call processing services. Periodic liveness detection of primary softswitch 16a and backup softswitch 16b may occur continuously. In the illustrated embodiment, ES 19 communicates a liveness probe at message 554 to primary softswitch 16a. Because primary softswitch 16a is available, it acknowledges the liveness probe and sends an OK message to ES 19 at message 556.

When system 10 determines that primary softswitch 16a or backup softswitch 16b becomes available again and the availability is verified, system 10 updates endpoint 12 to use the available softswitch 16 for subsequent call processing services. ES 19 communicates the update in availability to endpoint 12 by transmitting a Notified Entity Update at message 558. As part of message 558 or separately, ES 19 may also communicate, directly or inherently, primary address 92. Endpoint 12 acknowledges the message at message 560 and begins using primary softswitch 16a for subsequent call processing services.

Figure 6A:
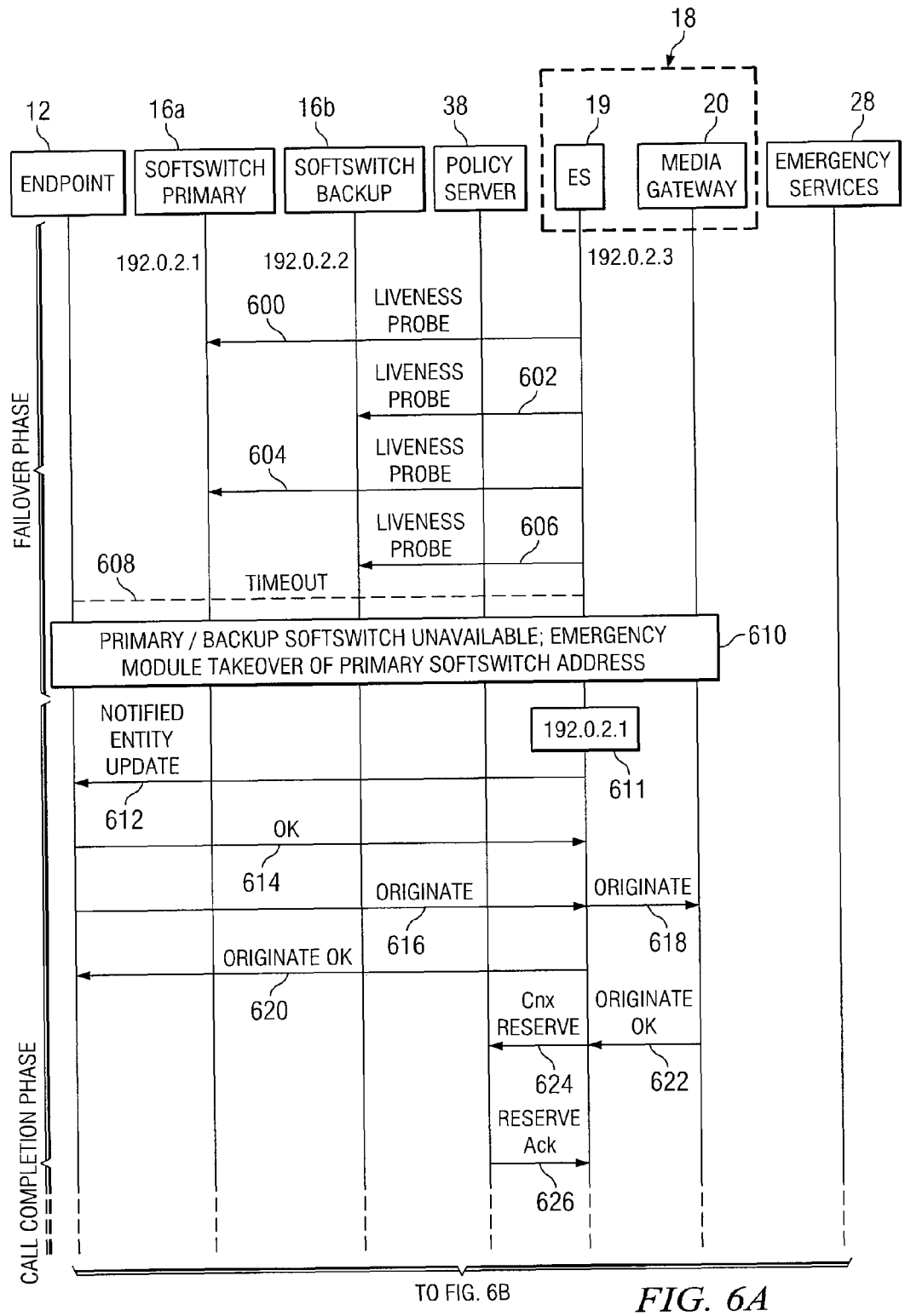
FIG. 6 is a call-flow diagram that illustrates initiating use of the emergency module for emergency communications without explicit interaction with the endpoint.
Figure 6B:
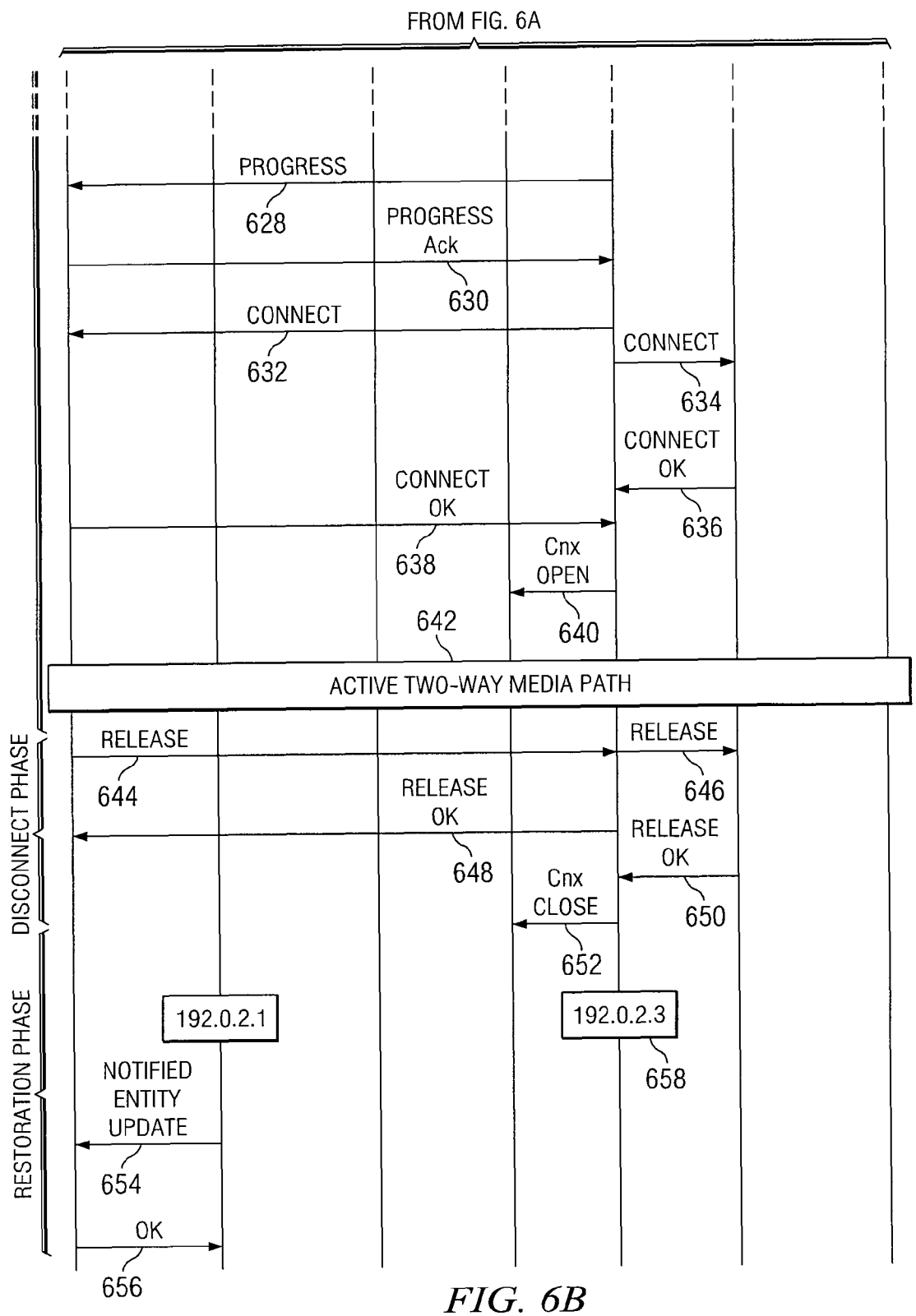

FIG. 6 is a call-flow diagram that illustrates ES 19 initiating use of emergency module 18 for emergency communications without explicit interaction with endpoint 12. ES 19 performs periodic liveness detection of primary softswitch 16a and backup softswitch 16b. In the illustrated embodiment, ES 19 communicates liveness probes to primary softswitch 16a at messages 600 and 604, and ES 19 communicates liveness probes to backup softswitch 16b at messages 602 and 606. A timeout occurs at 608. System 10 determines that primary softswitch 16a and backup softswitch 16b are unavailable at 610.

In the illustrated embodiment, softswitch 16a and 16b and ES 19 are identified by an IP address. For example, the IP address of primary softswitch 16a is 192.0.2.1, the IP address of backup softswitch 16b is 192.0.2.2, and the IP address of ES 19 is 192.0.2.3.

Endpoint 12 may not have the ability to receive another IP address in addition to the IP address of softswitch 16a and 16b used for normal call processing services. In this example, ES 19 communicates a Notified Entity Update to endpoint 12 in message 612. For the communication with endpoint 12, ES 19 masquerades its IP address as the IP address of primary softswitch 16a, 192.0.2.1, as shown at 611, instead of its configured address, 192.0.2.3. Endpoint 12 communicates an OK response to ES 19 at message 614.

At this point, ES 19 is the emergency call control entity for endpoint 12. To initiate an emergency call, endpoint 12 communicates an Originate message to IP address 192.0.2.1 in message 616. Because ES 19 masquerades its address as 192.0.2.1, ES 19 receives the Originate message. ES 19 communicates an Originate message 618 to media gateway 20. ES 19 communicates an Originate OK message to endpoint 12 at message 620, and media gateway 20 communicates an Originate OK message to ES 19 at message 622.

In the illustrated embodiment, a connection is reserved through an exchange with policy server 38 in preparation for a bearer media stream between endpoint 12 and emergency services 28. ES 19 communicates a Connection Reserve message to policy server 38 at message 624, and policy server 28 acknowledges the message by communicating a Reserve Acknowledgement to ES 19 at message 626.

If an emergency service 28 does not answer a call immediately, ES 19 may provide a progress indication in message 628 to endpoint 12. Endpoint 12 may acknowledge the progress indication as shown in message 630. When an emergency service 28 accepts the call, a connection is created and signaled to endpoint 12 and media gateway 20. ES 19 communicates a Connect message to endpoint 12 at message 632 and to media gateway 20 at message 634. Media gateway 20 acknowledges the Connect message at message 636, and endpoint 12 acknowledges the Connect message at message 638. ES 19 activates the bearer connection by communicating a Connection Open message to policy server 38 at message 640. An active two-way media path is established between endpoint 12 and emergency services 28 using media gateway 20 at 642.

To disconnect the call, endpoint 12 communicates a Release message to ES 19 at message 644. ES 19 communicates a Release message to media gateway 20 at message 646. ES 19 and media gateway 20 acknowledge the Release messages at messages 648 and 650, respectively. Because ES 19 opened a connection at message 640, ES 19 closes the connection by communicating a Connection Close message to policy server 38 at message 652.

Endpoint 12 may continue using emergency module 18 for call processing of emergency services while primary softswitch 16a and backup softswitch 16b are unavailable. When primary softswitch 16a or backup softswitch 16b become available, endpoint 12 may begin using softswitch 16a and 16b for normal and emergency call processing services. An operator or administrator of system 10 may restore the availability of softswitch 16a and 16b.

In the illustrated embodiment, an operator or administrator restores ES 19 to its original network address, causing it to discontinue masquerading its IP address as 192.0.2.1 at 658. The primary softswitch 16a is then able to communicate a Notified Entity Update message to endpoint 12 at message 654. Endpoint 12 acknowledges the message with an OK message at message 656 and uses primary softswitch 16a for subsequent call processing services.

Figure 7A:
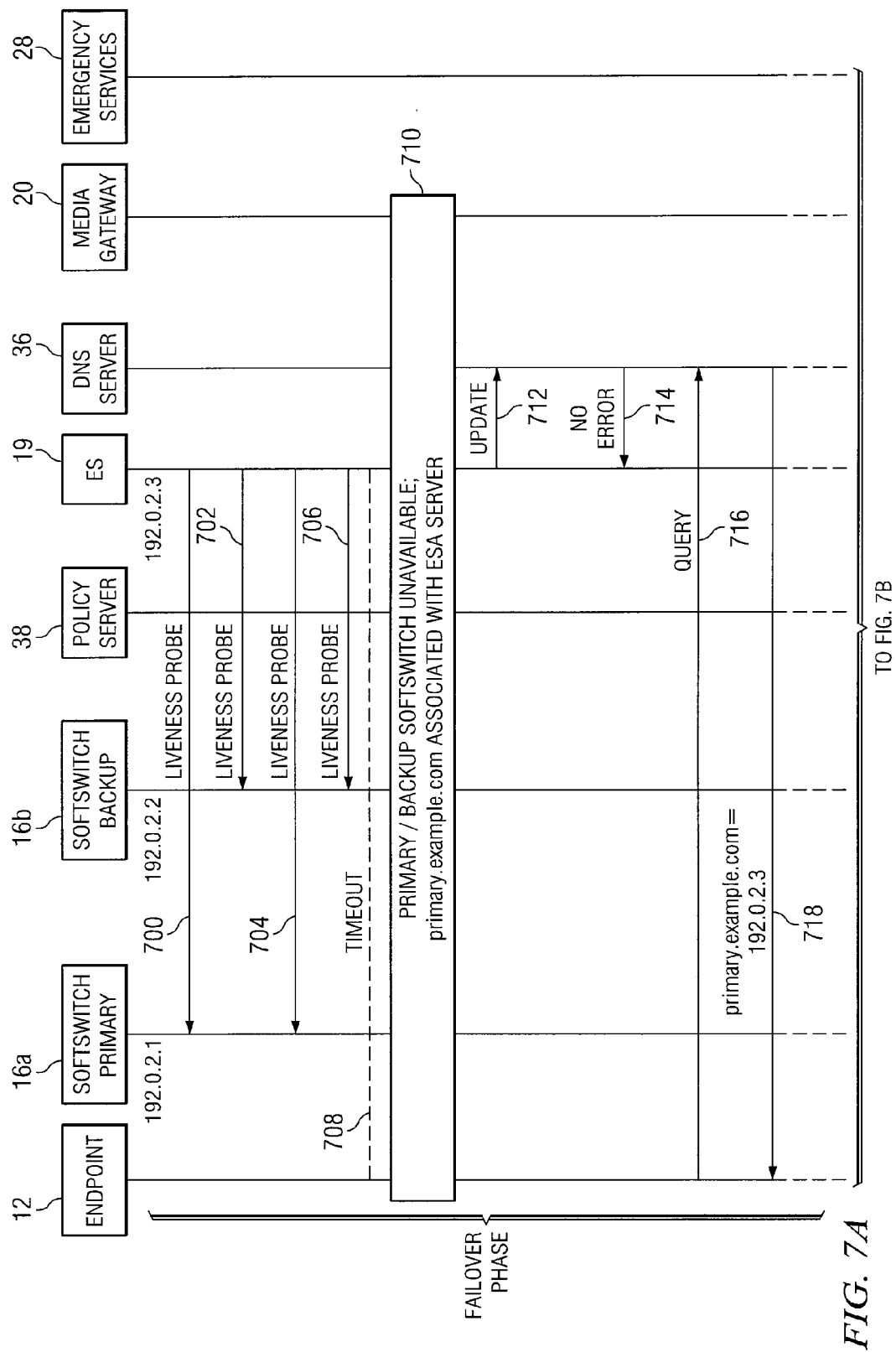
FIG. 7 is a call-flow diagram that illustrates the emergency server initiating use of the emergency module for emergency communications through interaction with other network services.
Figure 7B:
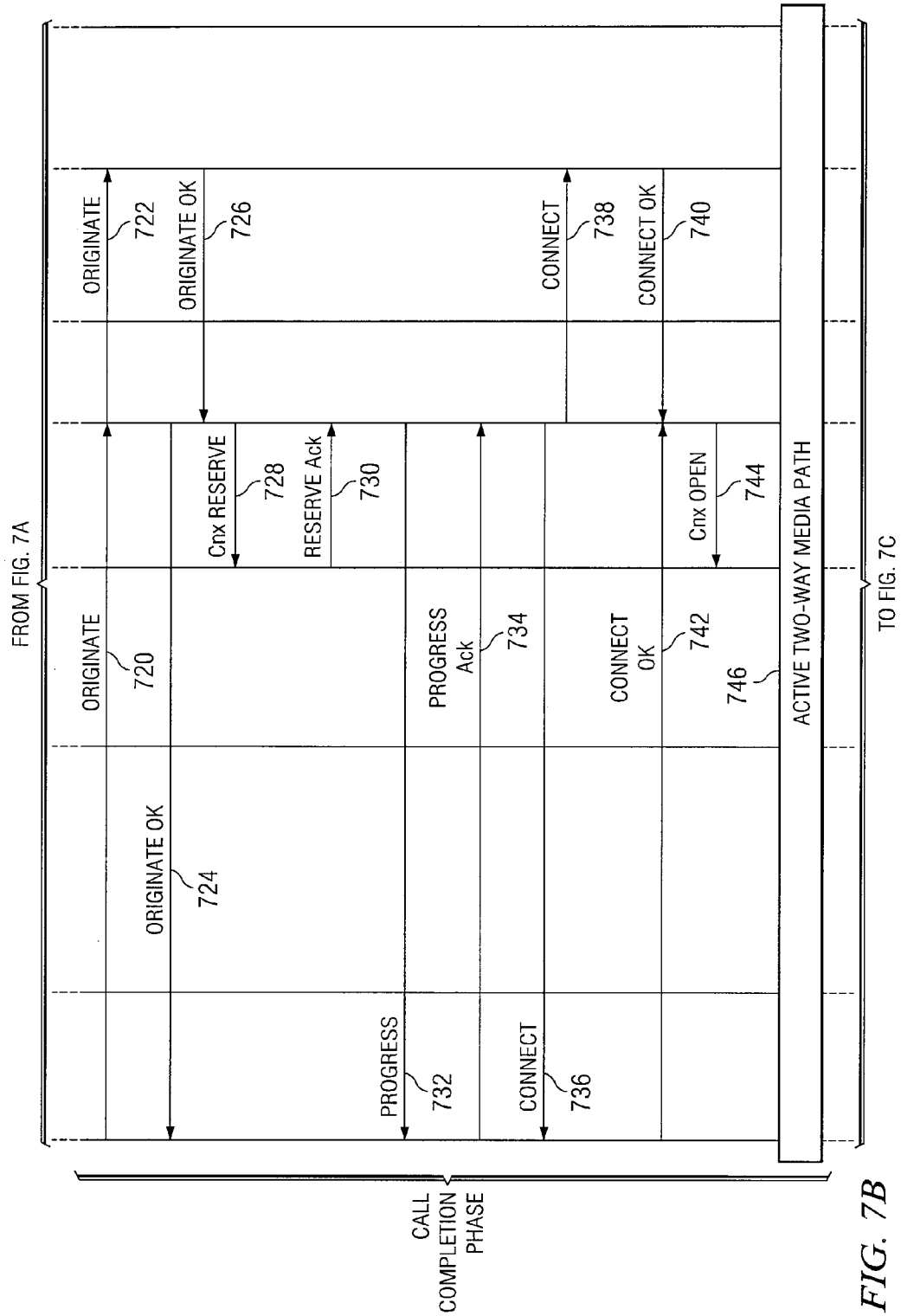
Figure 7C:
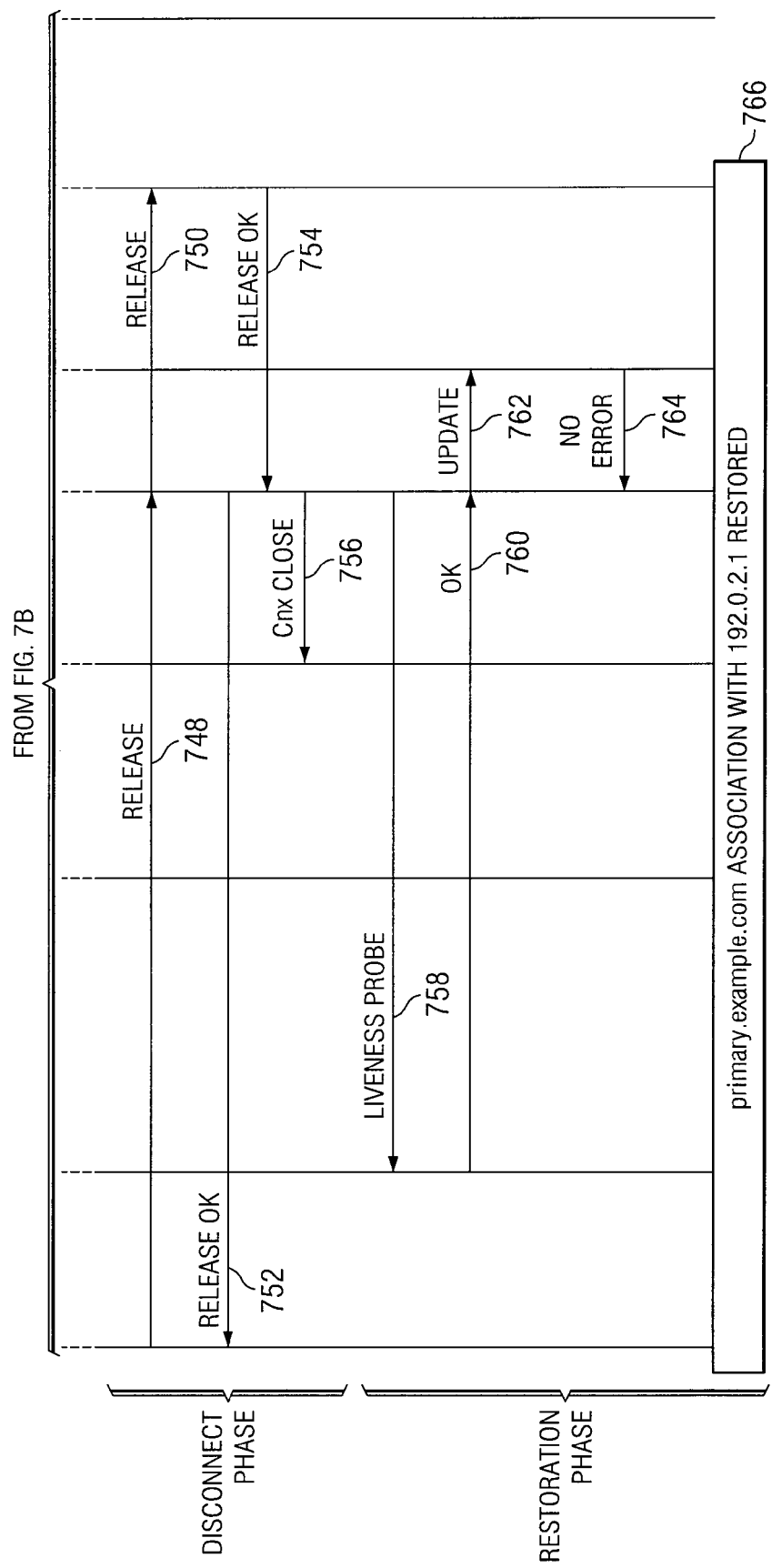

FIG. 7 is a call-flow diagram that illustrates ES 19 initiating use of emergency module 18 for emergency communications through interaction with other network services. In the illustrated embodiment, softswitch 16a and 16b and ES 19 are identified by IP addresses. For example, the IP address of primary softswitch 16a is 192.0.2.1, the IP address of backup softswitch 16b is 192.0.2.2, and the IP address of ES 19 is 192.0.2.3.

ES 19 performs periodic liveness detection of primary softswitch 16a and backup softswitch 16b. In the illustrated embodiment, ES 19 communicates liveness probes to primary softswitch 16a at messages 700 and 704, and ES 19 communicates liveness probes to backup softswitch 16b at messages 702 and 706. A timeout occurs at 708. In the illustrated embodiment, emergency module 18 determines that primary softswitch 16a and backup softswitch 16b are unavailable and associates the URI, primary.example.com, with ES 19 at 710.

As discussed above, ES 19 may be identified by a URI. ES 19 sends an Update message to DNS 36 at message 712. DNS 36 communicates a No Error message to ES 19 at message 714. Endpoint 12 queries DNS 36 at message 716 to receive the URI of element to use for emergency call service processing. DNS 36 responds with the URI associated with the IP address of ES 19 in message 718.

ES 19 is now the emergency call control entity for endpoint 12. To initiate an emergency call, endpoint 12 communicates an Originate message to ES 19 in message 720. ES 19 communicates an Originate message to media gateway 20 at message 722. ES 19 communicates an Originate OK message to endpoint 12 at message 724, and media gateway 20 communicates an Originate OK message to ES 19 at message 726.

In the illustrated embodiment, a connection is reserved through an exchange with policy server 38 in preparation for a bearer media stream between endpoint 12 and emergency services 28. ES 19 communicates a Connection Reserve message to policy server 38 at message 728, and policy server 28 acknowledges the message by communicating a Reserve Acknowledgement to ES 19 at message 730.

If an emergency service 28 does not answer a call immediately, ES 19 may provide a progress indication in message 732 to endpoint 12. Endpoint 12 may acknowledge the progress indication as shown in message 734. When an emergency service 28 accepts the call, a connection is created and signaled to endpoint 12 and media gateway 20. ES 19 communicates a Connect message to endpoint 12 at message 736 and to media gateway 20 at message 738. Media gateway 20 acknowledges the Connect message at message 740, and endpoint 12 acknowledges the Connect message at message 742. ES 19 activates the bearer connection by communicating a Connection Open message to policy server 38 at message 744. An active two-way media path is established between endpoint 12 and emergency services 28 using media gateway 20 at 746.

To disconnect the call, endpoint 12 communicates a Release message to ES 19 at message 748. ES 19 communicates a Release message to media gateway 20 at message 750. ES 19 and media gateway 20 acknowledge the Release messages at messages 752 and 754, respectively. Because ES 19 opened a connection at message 744, ES 19 closes the connection by communicating a Connection Close message to policy server 38 at message 756.

Endpoint 12 may continue using emergency module 18 for call processing of emergency services while primary softswitch 16a and backup softswitch 16b are unavailable. When primary softswitch 16a or backup softswitch 16b become available, endpoint 12 may begin using softswitch 16a and 16b for normal and emergency call processing services. To detect the availability of primary softswitch 16a or backup softswitch 16b, system 10 may send liveness probes to the softswitch 16a and 16b or an operator or administrator of system 10 may restore the availability of softswitch 16a and 16b. In the illustrated embodiment, ES 19 communicates a liveness probe to primary softswitch 16a at message 758. Primary softswitch 16a is available and communicates an OK message to ES 19 at message 760.

ES 19 communicates an Update to DNS 36 at message 762, and DNS 36 responds with a No Error message at message 764. System 10 restores the association of the URI, primary.example.com, to the IP address of primary softswitch 16a. Endpoint 12 may use primary softswitch 16a for subsequent call processing services.

Figure 8A:
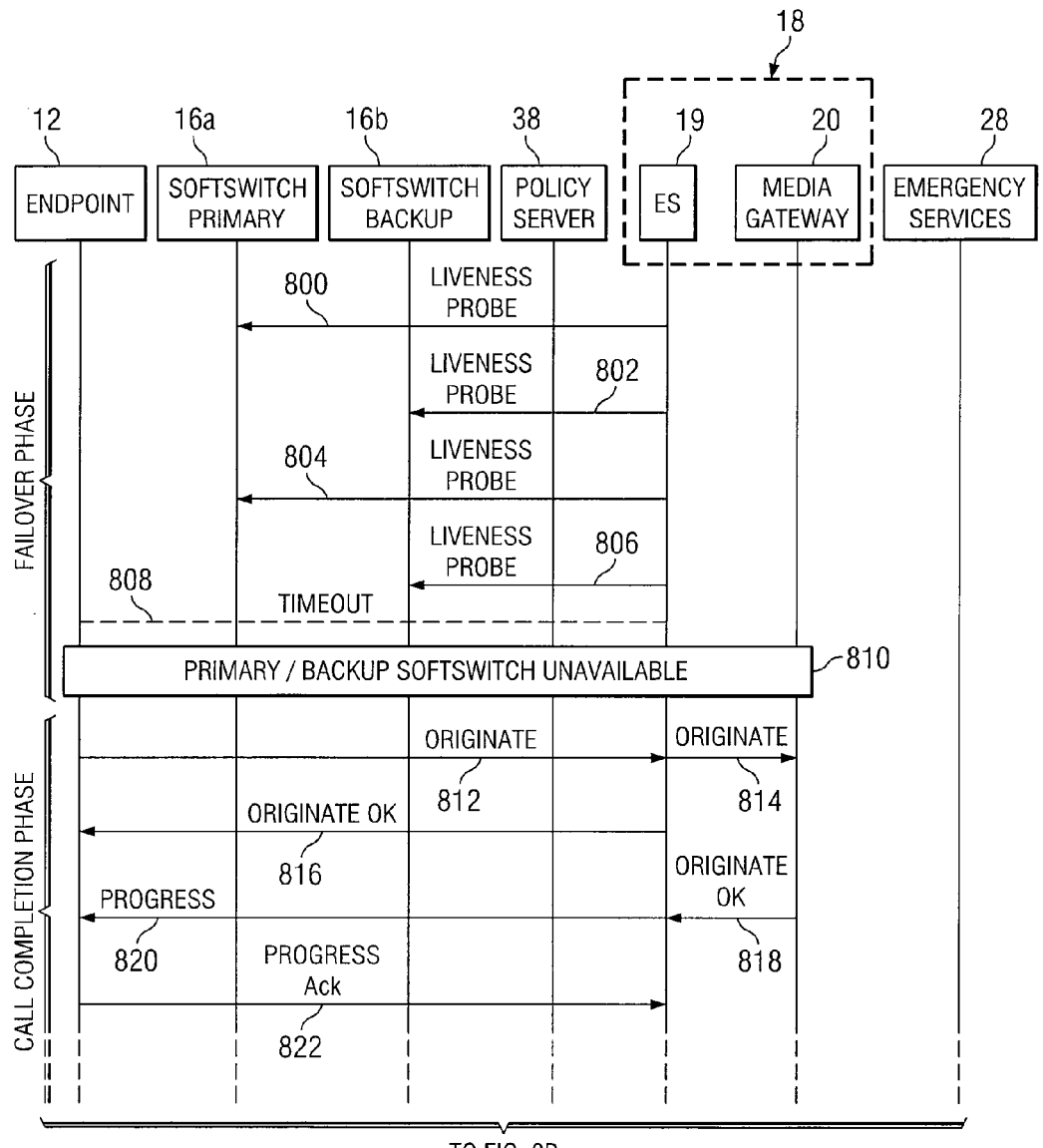
FIG. 8 is a call-flow diagram that illustrates the system transparently switching the emergency communications of the endpoint from softswitches to the emergency server.
Figure 8B:
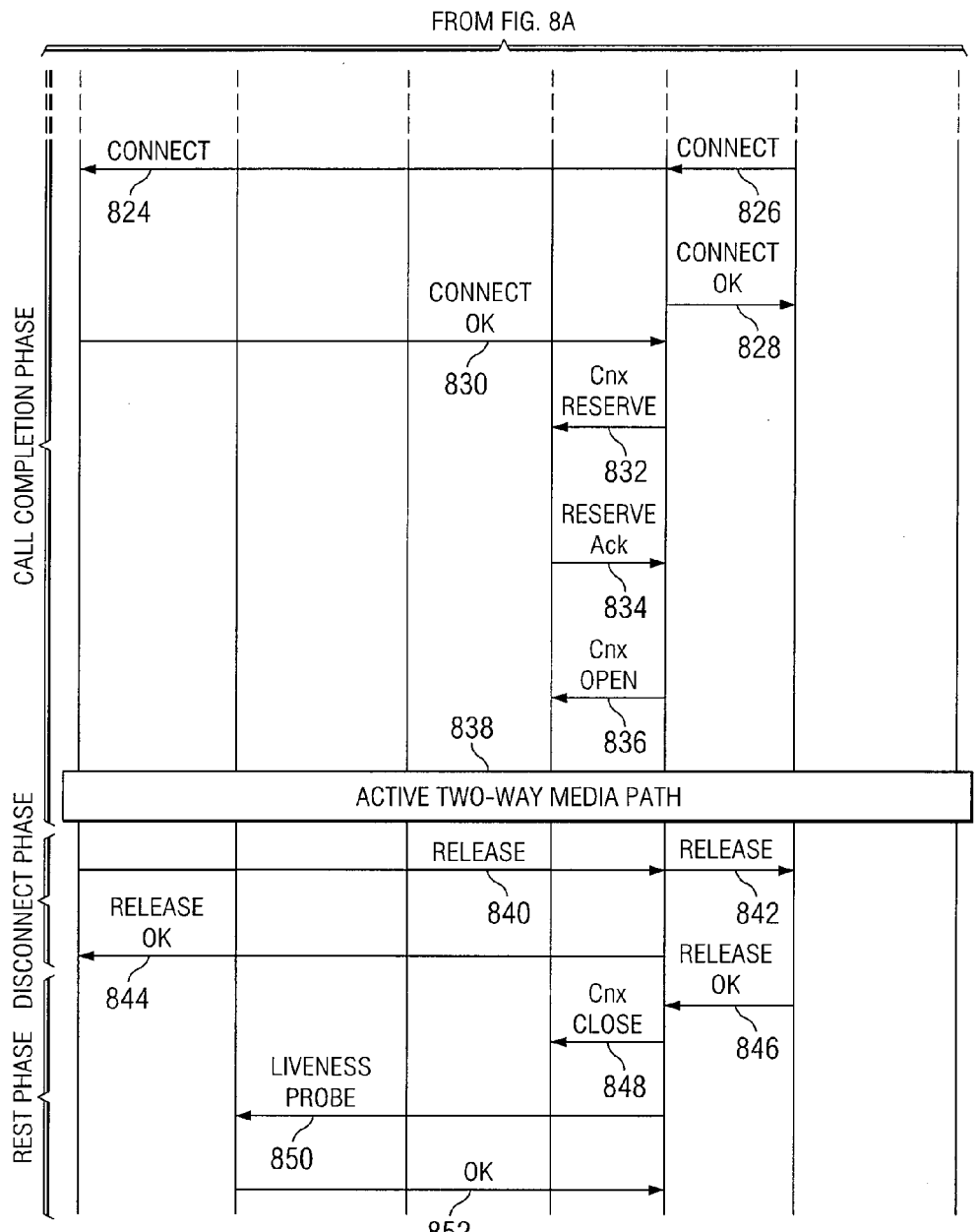

FIG. 8 is a call-flow diagram that illustrates system 10 transparently switching the emergency communications of endpoint 12 to emergency module 18 from softswitch 16a and 16b. In this call-flow diagram, endpoint 12 communicates events or call-signaling messages to emergency module 18 by default.

ES 19 performs periodic liveness detection of primary softswitch 16a and backup softswitch 16b. In the illustrated embodiment, ES 19 communicates liveness probes to primary softswitch 16a at messages 800 and 804, and ES 19 communicates liveness probes to backup softswitch 16b at messages 802 and 806. A timeout occurs at 808. System 10 determines that primary softswitch 16a and backup softswitch 16b are unavailable at 810.

Because of the unavailability of primary softswitch 16a and backup softswitch 16b, ES 19 transparently takes over emergency communications from endpoint 12. At message 812, endpoint 12 uses emergency address 96 to communicate an Originate message to ES 19, and ES 19 communicates an Originate message to media gateway 20 at message 814, in lieu of passing it on to primary softswitch 16a or backup softswitch 16b. ES 19 acknowledges the Originate message by communicating an Originate OK to endpoint 12 at message 816, and media gateway 20 acknowledges the Originate message by communicating an Originate OK to ES 19 at message 818.

ES 19 may provide a progress indication in message 820 to endpoint 12. Endpoint 12 may acknowledge the progress indication as shown in message 822. When an emergency service 28 accepts the call, a connection is created and signaled to ES 19 and endpoint 12. ES 19 communicates a Connect message to endpoint 12 at message 824, and media gateway 20 communicates a Connect message to ES 19 at message 826. ES 19 acknowledges the Connect message at message 828, and endpoint 12 acknowledges the Connect message at message 830.

In the illustrated embodiment, a connection is reserved through an exchange with policy server 38 in preparation for a bearer media stream between a called endpoint 12 and emergency services 28. ES 19 communicates a Connection Reserve message to policy server 38 at message 832, and policy server 28 acknowledges the message by communicating a Reserve Acknowledgement to ES 19 at message 834. ES 19 activates the bearer connection by communicating a Connection Open message to policy server 38 at message 836. An active two-way media path is established between endpoint 12 and media gateway 20 at 838.

To disconnect the call, endpoint 12 communicates a Release message to ES 19 at message 840. ES 19 communicates a Release message to media gateway 20 at message 842. ES 19 and media gateway 20 acknowledge the Release messages at messages 844 and 846, respectively. Because ES 19 opened a connection at message 836, ES 19 closes the connection by communicating a Connection Close message to policy server 38 at message 848.

Endpoint 12 may continue using emergency module 18 for call processing of emergency services while primary softswitch 16a and backup softswitch 16b are unavailable. When primary softswitch 16a or backup softswitch 16b become available, endpoint 12 may begin using softswitch 16a and 16b for normal and emergency call processing services.

Periodic liveness detection of primary softswitch 16a and backup softswitch 16b may occur continuously. In the illustrated embodiment, ES 19 communicates a liveness probe at message 850 to primary softswitch 16a. Because primary softswitch 16a is available, it acknowledges the liveness probe and sends an OK message to ES 19 at message 852. ES 19 will then resume forwarding messages from endpoint 12 to primary softswitch 16a for subsequent call processing services.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for redirecting an emergency communication, comprising:
   initiating emergency communication from an endpoint;
   determining unavailability of a softswitch;
   identifying an emergency server that handles call control for emergency communication from the endpoint if the softswitch is unavailable, wherein identifying an emergency server comprises determining an address of the emergency server, wherein the emergency server is configured to provide call control for endpoints connected to a network via different access devices; and
   initiating emergency communication with the emergency server.

2. The method of claim 1, wherein determining unavailability of a softswitch comprises transmitting a keep-alive message to the softswitch.

3. The method of claim 1, further comprising:
   determining availability of the softswitch; and
   redirecting call control of emergency communication from the emergency server to the softswitch.

4. The method of claim 3, wherein determining availability of the softswitch comprises receiving a response to a keep-alive message.

5. The method of claim 1, wherein the softswitch is unavailable according to at least one of a softswitch failure and a network failure.

6. The method of claim 1, wherein determining an address of the emergency server comprises retrieving an emergency address associated with the emergency server.

7. The method of claim 1, wherein determining an address of the emergency server comprises retrieving a primary address associated with the softswitch.

8. The method of claim 1, wherein initiating emergency communication comprises redirecting emergency communication from the softswitch to the emergency server.

9. The method of claim 1, wherein the emergency server is transparent to the softswitch.

10. An apparatus, comprising:
    an interface operable to receive an input to initiate emergency communication;
    a processor coupled to the interface, the processor operable to process the input to facilitate initiation of emergency communication;
    a network interface coupled to the processor, the network interface operable to transmit emergency communication to a communications network; and
    a memory coupled to the processor, the memory operable to store at least three addresses, comprising:
    a first address identifying a primary softswitch for call control;
    a second address identifying a backup softswitch for call control if the primary softswitch is unavailable; and
    a third address identifying an emergency server for emergency communication if the primary and backup softswitches are unavailable, wherein the emergency server is configured to provide call control for endpoints connected to a network via different access devices.

11. The apparatus of claim 10, wherein at least one of the first, second, and third addresses is an Internet Protocol (IP) address.

12. The apparatus of claim 10, wherein at least one of the first, second, and third addresses is a domain name.

13. The apparatus of claim 10, wherein the input is an emergency telephone number.

14. The apparatus of claim 10, wherein:
    the processor is further operable to determine that the primary and backup softswitches are unavailable; and
    the network interface is further operable to transmit emergency communication to the emergency server.

15. The apparatus of claim 10, wherein the network interface is further operable to transmit a keep-alive message to monitor availability of the primary and backup softswitches.

16. The apparatus of claim 10, wherein the network interface is further operable to transmit emergency communication to the emergency server.

17. The apparatus of claim 16, wherein the network interface is further operable to redirect emergency communication from the primary and backup softswitches to the emergency server.

18. An emergency module, comprising:
an emergency server operable to facilitate call processing of emergency communication if a softswitch is unavailable, wherein the emergency server is configured to provide call control for endpoints connected to a network via different access devices, the emergency server comprising:
a network interface operable to receive emergency communication from an endpoint;
a physical processor coupled to the network interface, the processor operable to implement call processing of emergency communication; and
a memory coupled to the processor, the memory operable to store an address identifying the emergency server for emergency communication if a softswitch is unavailable.

19. The emergency module of claim 18, further comprising a media gateway operable to communicate emergency communication to an emergency service.

20. The emergency module of claim 18, wherein the emergency server is operable to:
communicate a keep-alive message to a softswitch implementing call processing for the endpoint;
determine whether the network interface receives a response to the keep-alive message;
if the network interface does not receive a response, communicate an update of emergency communication call processing to the endpoint;
receive emergency communication from the endpoint; and
process emergency communication of the endpoint.

21. The emergency module of claim 18, wherein the emergency server is operable to:
receive emergency communication from the endpoint, if the endpoint determines unavailability of a softswitch for call processing; and
process emergency communication of the endpoint.

22. The emergency module of claim 18, wherein the emergency server is operable to associate the identifier with a domain name of a softswitch.

23. The emergency module of claim 18, wherein the emergency server is operable to mask the identifier as an identifier of a softswitch.

24. The emergency module of claim 18, wherein the identifier is an Internet Protocol address.

25. Logic for redirecting an emergency communication, the logic embodied in a non-transitory computer readable medium and operable to:
initiate emergency communication from an endpoint;
determine unavailability of a softswitch;
identify an emergency server that handles call control for emergency communication from the endpoint if the softswitch is unavailable, wherein identifying an emergency server comprises determining an address of the emergency server, wherein the emergency server is configured to provide call control for endpoints connected to a network via different access devices; and
initiate emergency communication with the emergency server.

26. The logic of claim 25, wherein determining unavailability of a softswitch comprises transmitting a keep-alive message to the softswitch.

27. The logic of claim 25, the logic further operable to:
determine availability of the softswitch; and redirect call control of emergency communication from the emergency server to the softswitch.

28. The logic of claim 27, wherein determining availability of the softswitch comprises receiving a response to a keep-alive message.

29. The logic of claim 25, wherein the softswitch is unavailable according to at least one of a softswitch failure and a network failure.

30. The logic of claim 25, wherein determining an address of the emergency server comprises retrieving an emergency address associated with the emergency server.

31. The logic of claim 25, wherein determining an address of the emergency server comprises retrieving a primary address associated with the softswitch.

32. The logic of claim 25, wherein initiating emergency communication comprises redirecting emergency communication from the softswitch to the emergency server.

33. The logic of claim 25, wherein the emergency server is transparent to the softswitch.

34. A system for redirecting an emergency communication, comprising:
means for initiating emergency communication from an endpoint;
means for determining unavailability of a softswitch;
means for identifying an emergency server that handles call control for emergency communication from the endpoint if the softswitch is unavailable, wherein identifying an emergency server comprises determining an address of the emergency server, wherein the emergency server is configured to provide call control for endpoints connected to a network via different access devices; and
means for initiating emergency communication with the emergency server.

* * * * *